US008444018B2

(12) United States Patent
Strobel-Schmidt et al.

(10) Patent No.: US 8,444,018 B2
(45) Date of Patent: May 21, 2013

(54) EXTRUSION DEVICE

(75) Inventors: Rainer Strobel-Schmidt, Bad Worishofen (DE); Christian Hefele, Breitenbrunn (DE); Hans-Peter Lederle, Durach (DE)

(73) Assignee: Hilti Aktiengesellschaft (LI)

( * ) Notice: Subject to any disclaimer, the term of this patent is extended or adjusted under 35 U.S.C. 154(b) by 143 days.

(21) Appl. No.: 13/175,375

(22) Filed: Jul. 1, 2011

(65) Prior Publication Data

US 2012/0031931 A1 Feb. 9, 2012

(30) Foreign Application Priority Data

Jul. 2, 2010 (DE) ......................... 10 2010 030 841

(51) Int. Cl.
*G01F 11/00* (2006.01)
*B67D 7/70* (2010.01)

(52) U.S. Cl.
USPC ........................................... 222/137; 222/391

(58) Field of Classification Search .................. 222/391, 222/137, 135, 144, 145.1, 323, 392, 326, 222/327; 401/179, 181; 74/111, 141.5, 144
See application file for complete search history.

(56) References Cited

U.S. PATENT DOCUMENTS 2,367,346 A * 1/1945 Good .............................. 74/169
3,311,265 A * 3/1967 Creighton, Jr. et al. ........ 222/137
4,330,070 A * 5/1982 Doubleday ...................... 222/43
4,471,888 A * 9/1984 Herb et al. ..................... 222/137
5,529,245 A * 6/1996 Brown ........................... 239/390
6,047,861 A * 4/2000 Vidal et al. ..................... 222/137
6,394,982 B1 * 5/2002 Ehrenfels ....................... 604/191
7,032,785 B1 * 4/2006 Huang ........................... 222/391
7,674,247 B2 * 3/2010 Fojtik ............................ 604/191

FOREIGN PATENT DOCUMENTS

DE 102007057111 A1 5/2009
EP 0758564 A1 2/1997
WO WO 8704644 A1 * 8/1987

OTHER PUBLICATIONS

EPO Communication dated Sep. 26, 2011 in Application No. 111680583-2425 (6 pages).

* cited by examiner

*Primary Examiner* — Kevin P Shaver
*Assistant Examiner* — Benjamin R Shaw
(74) *Attorney, Agent, or Firm* — McAndrews, Held & Malloy, Ltd.

(57) ABSTRACT

An extrusion device for the extrusion of single- or multi-component materials from at least one container is provided. The extrusion device includes a housing having a functional section and a manual operation section. The housing extends substantially along an axial direction. The functional section includes at least one container receptacle. The manual operation section includes a lever arrangement via which an extrusion rod arrangement can be actuated to extrude materials from the at least one container. The lever arrangement includes a lever body mounted on a rotary axis. The lever body includes a lever push arm on one side of the rotary axis and a lever grip arm on the other side of the rotary axis. The lever push arm acts in a force-transmitting manner on a drive body attached on the extrusion rod arrangement upon actuation of the lever grip arm. The lever body includes a fork which forms at least two fork sections, and a fork trunk, wherein each of the at least two fork sections each extends into a lever push arm, and the fork trunk extends into the lever grip arm.

18 Claims, 7 Drawing Sheets

EXTRUSION DEVICE

RELATED APPLICATIONS

The present application claims priority to German Patent Application DE 10 2010 030 841.2, filed Jul. 2, 2010, and entitled "Auspressvorrichtung" ("Extrusion Device"), the entire content of which is incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

In sealing or gluing applications, single component or multiple component materials are used, wherein the same are placed in containers, such as plastic sacks, cartridges, or similar packaging. An extrusion device serves to receive such a container and to extrude a single component or multiple component material out of the container for the purpose described above.

An extrusion device of the type indicated above is disclosed in DE 195 33 223 A1, for example. A lever body, which is termed a transport lever in the named prior art, is mounted on a rotary axis, and has a lever push arm on one side of the rotary axis and a lever grip arm on the other side of the rotary axis. The lever push arm functions to transfer a force when the lever grip arm is operated, said force acting on a drive body attached to a rod arrangement. The disclosed extrusion device according to the prior art, which is a single component device, provides an additional lever as well as a grip, the same being characterized as an actuating element, for the purpose of operating the lever body. The drive body has a roll which works together with the roller head of the lever push arm. The rod arrangement has a piston rod which is advanced in a stepwise manner via the drive body, wherein a corresponding amount of the material is pressed out of the single container in this way. A similar single component extrusion device is disclosed in DE 195 33 155 A1.

With respect to the amount of force required on the part of a user, a measured transmittance of force to the rod arrangement is desirable. In DE 10 2007 057 111 A1, one possibility for such a solution is suggested for a single component extrusion device.

A particular problem arises for extrusion devices which are intended to also be suitable for the extrusion of multi-component materials from at least one container, in a special manner, that is particularly for two or more containers, in addition to the extrusion of single component materials. For example, two containers can be arranged in one or two container receptacles of a functional segment of the extrusion device named above, and the contents thereof extruded via the extrusion rod arrangement. A lever arrangement as explained above, having a single lever body and typically being provided in a section of the device intended for manual operation, can be modified in such a manner that it acts on two or more drive bodies on two or more rods of the extrusion rod arrangement for the two or more containers. The drive bodies can be coupled via a brace or a plunger plate or a similar device, such that a force from a single lever body can nevertheless be transmitted to the at least two drive bodies. A disadvantage with this configuration is the maximum transmittable force, which is only limited by a brace or a plunger plate. The design of a brace or a plunger plate, and the optionally complex guidance for such a coupling means provided separately therefrom, can exercise a force-limiting effect. By means of an insufficient guidance or excessive force, a coupling element such as a brace or a plunger plate or the like can be bent or made askew undesirably, such that asymmetries or jams can arise in the section of the device intended for manual operation. This can significantly complicate the manipulation of the extrusion device, and can damage the extrusion device in the worst cases. An extrusion device which is designed for the extrusion of multi-component materials and the receiving of two or more containers in an improved manner would be desirable, wherein the same is nevertheless suitable for the extrusion of single component materials and the receiving of a single container.

BRIEF SUMMARY OF THE INVENTION

A problem addressed by aspects of the present invention is that of providing an extrusion device for the extrusion of single or multi-component materials from at least one container, wherein a section thereof intended for manual operation, said section having a lever arrangement, is arranged in an improved manner for the purpose of enabling the extrusion of both single component and multi-component materials by means of a simple and nevertheless reliable transmission of force.

Particularly, aspects of the present invention should improve a coupling between the lever arrangement and the extrusion rod arrangement of the extrusion device for the extrusion of material from at least two containers.

The problem addressed by aspects of the present invention with respect to the extrusion device is solved by aspects of the present invention by means of an extrusion device of the type named above, wherein the inventive features of the characteristic part of claim 1 are included.

According to aspects of the present invention, the lever body has a fork which in turn has a fork trunk and at least two fork sections; that is, a number equaling two, three, four, or more fork sections. Two fork sections are preferably provided. Each of the fork sections is assigned to a container which can be arranged in the extrusion device. For this purpose, the at least two fork sections open into at least two lever push arms. The fork trunk of the lever body opens into the lever grip arm of the lever body. A single fork trunk is preferably provided.

Overall, the concept of aspects of the present invention enables a comparatively simple to realize, preferably one-piece lever body having a fork according to aspects of the present invention. The lever grip arm directly receives the force provided by an operator during use, preferably when an associated lever grip of the extrusion device is actuated. Each of the lever push arms directly—that is, particularly without the use of a coupling element as suggested in the prior art—transmits the force to each of the drive bodies while executing a rotary movement about the axis of rotation of the lever body mounted at that point. In other words, the lever body acts directly on the drive body attached to the extrusion rod arrangement upon actuation of the lever grip arm, in an essentially force-transmitting manner. This applies both to cases wherein a single container is used for a single component material, and to cases involving multiple containers for a multi-component material. In the present case, each of the lever push arms directly transmits force to each of the drive bodies attached to the extrusion rod arrangement upon actuation of the lever grip arm, wherein each of the drive bodies is assigned to one container out of a number of containers in the extrusion device. The extrusion rod arrangement preferably has at least two rods, wherein at least one drive body as named above is attached to each of the rods. Each of the containers can, but not necessarily, contain a different material. For example, two-component materials can be extruded via two containers. The containers can be arranged parallel to each other in a single container receptacle, or can be optionally arranged individually in two container receptacles designed for each of the containers, for example.

Overall, the concept of aspects of the present invention enables an improved transmission of force upon the conversion of a rotary movement of the lever arm into a linear movement of at least two drive bodies, that is two or more drive bodies, by means of an arrangement wherein each of the lever push arms acts directly on each of the drive bodies, and wherein moreover that lever body is designed in a comparatively simple manner. In addition, according to aspects of the present invention, the fork explained above has at least two fork sections and a fork trunk. The concept of the invention renders force-transmitting coupling elements, such as braces, plunger plates, or the like, redundant, because the lever body—preferably a one-piece lever body—forms the required number of lever push arms.

Even in the case of highly varying forces which are directed against the drive body from the container side, the lever arrangement is sufficiently stable on its own. It is possible to extrude materials from two or more containers without the known disadvantages of the prior art. Particularly, the lever arrangement according to the concept of aspects of the present invention does not tend to become canted or tilted. For example, essentially no torsional moments are created, such that overall an otherwise complex mounting of the parts of the lever arrangement, particularly the drive body, is substantially unnecessary and/or can be significantly simplified. The concept of aspects of the present invention enables each of the drive bodies to be directly actuated via one of the lever push arms, without a coupling element, in a particularly preferred manner.

Advantageous implementations of the invention are included in the dependent claims, and indicate individual advantageous possibilities for realizing the concept explained above with respect to the problem addressed by the invention, and with respect to additional advantages.

A lever body is preferably mounted on the rotary axis by means of the at least two fork sections. This is an especially stable mounting of the lever body on the rotary axis, particularly on each of the fork sections. Preferably, a point of forking of the fork is arranged on the other side of the rotary axis; that is, the same forms a part of the lever grip arm arranged on the other side of the rotary axis. Preferably, the at least two fork sections form at least a subsection of the lever grip arm. In other words, the lever grip arm branches at the point of forking into a number of fork sections totaling at least two. According to this preferred configuration, the lever body is mounted no closer than the region of each of the fork sections.

In an alternative configuration, in principle the lever body can be mounted to the rotary axis by means of the fork trunk. Such a mounting of the fork trunk—particularly of a single fork trunk on a single or on a number of positions on the rotary axis—can be designed in a sufficiently stable manner depending on requirements. In principle, this further variant can also sufficiently realize the advantages of the concept of aspects of the present invention. In this further configuration, a point of forking of the fork particularly forms part of the lever push arm on one side of the rotary axis, and the at least two fork sections each extend exclusively in the region of a lever push arm.

Preferably, the rotary axis is formed as a bearing pin which is particularly arranged in a center of rotation. Said bearing pin is preferably provided for the purpose of mounting the lever body on one or more points. Particularly according to the first named preferred variant above, the bearing pin passes through the at least two fork sections and is consequently provided on at least two points for the purpose of an especially stable mounting of the lever body. According to the additional latter variant, the bearing pin passes through the fork trunk particularly at the rotary axis.

In an especially preferred implementation, the lever body is formed in the region of the forking by means of two metal plain sheets. In a preferred modification of this implementation, the metal plain sheets abut each other in the fork trunk and are set at a distance from each other in the at least two fork sections. In cases where a larger number of fork sections are included—for example three, four, or five fork sections—the lever body can be formed in a comparatively simple manner from a corresponding number of three, four, five, or more metal plain sheets. In this case, each of the metal plain sheets forms a fork section at a location beyond the forking, particularly on at least one side of the rotary axis.

In a particularly preferred implementation, at least one lever push arm has a force-transmitting fork end which can roll down on a drive body upon actuation of the lever grip arm. The fork end can be formed in a functional manner for the purpose of improving the transmission of force between the lever push arm and the drive body, or for the purpose of adjusting to an extrusion material. A rotary movement of the lever push arm can be converted in an especially effective manner into a linear movement of the drive body in a manner adjusted to requirements. Preferably, the fork end has a nose-shaped roller head.

A roller head can have a nose contour designed according to requirements for the purpose of effectively converting the rotary movement of the lever push arm into a linear movement of the drive body.

In principle, two or more of the lever push arms of the lever body can be designed on the fork ends thereof as identical parts. Particularly, all lever push arms of the lever body can be designed as identical parts.

In an alternative, particularly preferred implementation, a first lever push arm can be given a different design from a second lever push arm. For example, the axial pushing characteristics or the forward-advancing characteristics of a first and a second drive body can be tuned differently. Preferably, a first lever push arm can have a length which is different from that of a second lever push arm. As such, an axial pushing process and/or an axial travel of a first and a second drive body which are assigned to the first and the second lever push arm can be tuned differently by means of the stroke of the lever push arm.

In addition or as an alternative, the advantage of a configuration has been demonstrated, wherein a first lever push arm has a fork end which is different from that of a second lever push arm. Particularly, a first fork end can have a nose contour of a first roller head, said nose contour differing from that of a nose contour of a second roller head on a second fork end. The characteristics of an axial pushing process and/or an axial travel given a specific stroke can be generated in an especially advantageous manner via a rolling curve of a fork end, said rolling curve being assigned to a nose contour—that is, in addition or as an alternative to the previously named, optionally different length of a lever push arm. In summary, it is possible to effect variable lever characteristics by means of varying the length of different lever push arms and/or a nose contour of different roller heads for the different fork ends. This leads to different axial pushing characteristics and/or advancement characteristics of the associated drive body. These measures can be adjusted according to the respective requirements of the container assigned to a lever push arm, and the material received therein.

A drive body is preferably designed as a clamping element which can be attached on a rod of the extrusion rod arrangement and can tilt and become clamped when force is applied thereto. Particularly, a circular disk shape has proven advantageous for the drive body. This simplifies the attachment of a drive body to a rod of the extrusion rod arrangement practically independent of orientation.

However, a drive body can also have corners, for example in a rectangular or trapezoidal shape. A drive body can preferably be advanced on a rod of the outlet rod arrangement in the axial direction at the rate of one unit of advancement per operation stroke of the lever push arm. The unit of advancement is preferably variable but predetermined. In this way, it is possible to determine a unit of advancement for the system consisting of a rod, drive body, and the assigned fork end of a lever push arm in the axial direction occurring per operation stroke, wherein said unit of advancement is adjusted to the associated container and/or the material contained therein.

In a further implementation of the concept of aspects of the present invention, a first drive body is attached on a first rod and is assigned to the first lever push arm, and a second drive body which is assigned to the second lever push arm is attached on a second rod.

Particularly, a first drive body can be held at an offset with respect to a second drive body. This leads in an advantageous manner to an adjustment of the lever characteristics to a container assigned to the drive body. In a further implementation of the invention, a first drive body can particularly be pushed one first unit of advancement, and a second drive body can be pushed one second unit of advancement, wherein the first unit of advancement can be different from the second unit of advancement. This leads particularly to an offset of the first drive body to the second drive body which is adjusted to requirements, and to a separation distance between the rotary axis and the grip point of a fork end on the drive body which is different for each lever push arm.

In a particularly preferred implementation of the invention, a first and/or a second drive body forms a frontal drive body on the same rod of the drive rod arrangement, said frontal drive body being arranged relative to a respective rear drive body. The frontal and the rear drive bodies are preferably parts of one drive unit. The drive unit preferably has a holder which holds the drive bodies. The holder preferably has an arm attached to an axis for each of the frontal and rear drive bodies, for the purpose of holding the frontal and rear drive bodies at a distance to each other.

An extrusion device having a lever body with exactly two fork sections and a single fork trunk is particularly preferred. For this implementation, two drive bodies are provided as frontal drive bodies. A third and a fourth drive body are both held in position on the same rod of the drive rod arrangement as rear drive bodies relative to the respective frontal drive bodies.

Preferably, the third and the fourth drive bodies are also held at a distance from a frontal drive body by means of a holder.

A frontal drive body is fixed on a rod upon the exertion of force on said drive body, preferably in a clamping manner and tilted in the direction of advancement. A rear drive body is fixed on a rod upon the exertion of force on said drive body, preferably in a clamping manner and tilted against the direction of advancement. The frontal drive body serves to advance the rod upon the extrusion of a material from a container, in an advantageous manner. The rear drive body preferably serves to hold the rod in position as long as a counter force of the material is being exerted, and a lever push arm is not exerting any force, i.e., when the operator has not released the lever grip.

Embodiments of the invention are described below with reference to the illustrations. These are not necessarily intended to fully demonstrate the embodiments; rather, the illustrations are provided in schematic form or with minor scale adjustments when the same serve the purpose of clarification. Attention is directed to the relevant prior art for further expansion of the teaching which is immediately recognizable from the illustration. Numerous modifications and changes relating to the form and details of a single embodiment can be undertaken without deviating from the general idea of the invention. The disclosed features of aspects of the invention in the description, in the illustrations, and in the claims can be essential for the implementation of aspects of the invention either individually or in any possible combination thereof. In addition, all combinations of at least two of the features disclosed in the description, in the illustration, and/or in the claims are considered to fall within the scope of the invention. The general idea of the invention is not restricted to the exact form or the details of the preferred embodiment portrayed and described in the following, nor is it restricted to a subject matter which would be restricted in comparison to the subject matter claimed in the claims part. Where ranges of measurements are given, all values lying with the boundaries should also be considered disclosed as threshold values, and can be used and claimed in any manner. For the purpose of simplicity, the same reference numbers are used below for identical or similar parts, or for parts with identical or similar functions.

BRIEF DESCRIPTION OF THE DRAWINGS

Additional advantages, features, and details of the invention are found in the following description of certain preferred embodiments, as well as in reference to the illustrations, wherein.

DETAILED DESCRIPTION OF THE INVENTION

Figure 1:
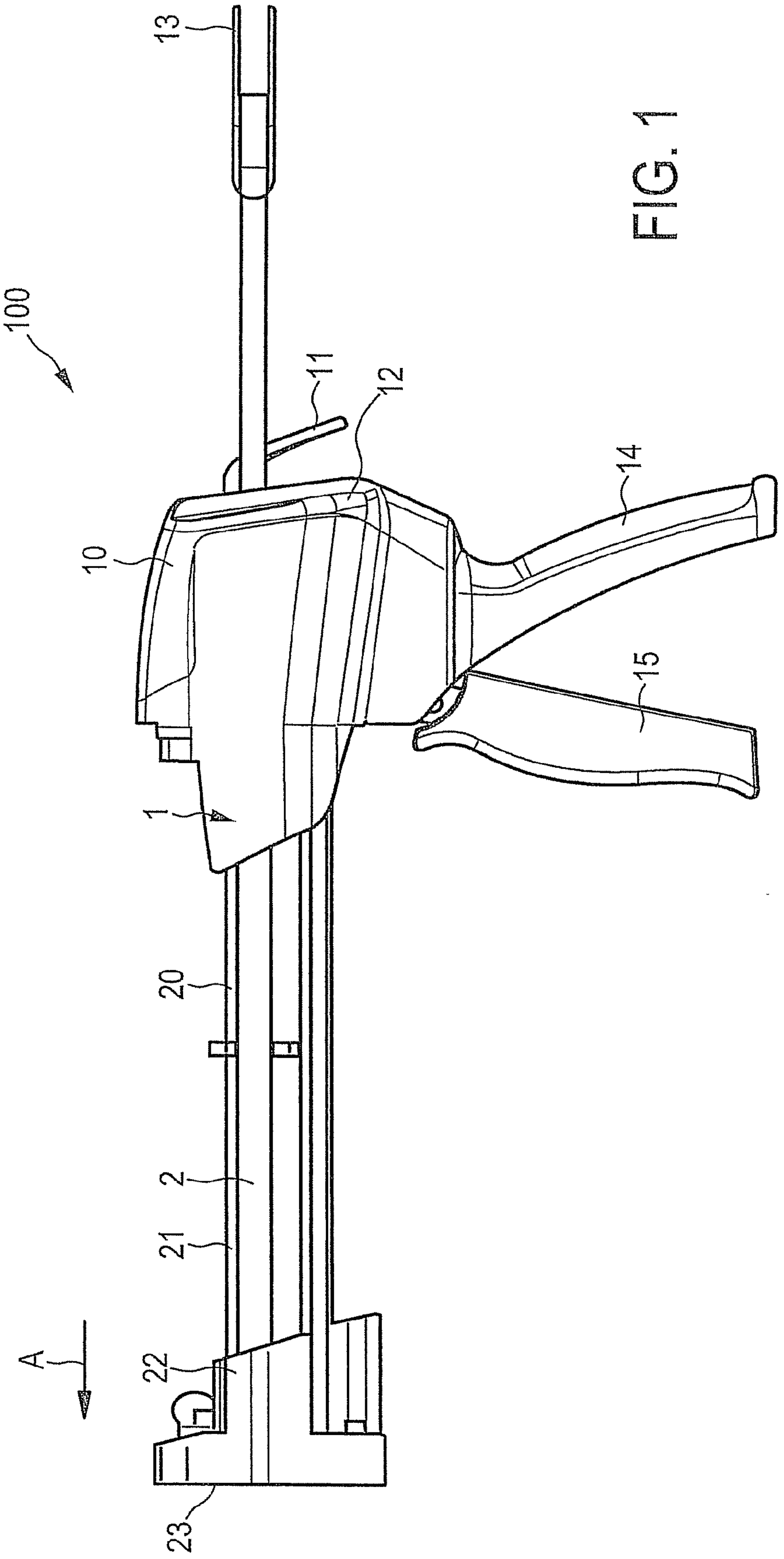
FIG. 1 shows a partial perspective side view of an extrusion device for extruding multi-component materials from two containers, in accordance with an embodiment of the present invention.

FIG. 1 shows an extrusion device 100 for the extrusion of single component and, in the present case, particularly multi-component materials for the purposes of filling, gluing, sealing, or the like in construction applications. Such materials and/or other materials are filled in two containers 2, which are designed as cartridges in the present example.

The containers 2 are arranged in a suitable container receptacle 21 of a housing 1 of the extrusion device 100. The housing 1 extends in the present case substantially along an axial direction A, and has a functional section 20 and a manual operation section 10. The functional section 20 has, substantially, the container receptacle 21 and a processing head 22 which is located on a distal end 23 of the functional section 20 on the processing side. An extrusion opening of each container 2 projects into said processing head 22, and is not portrayed in detail. Materials discharged from the containers 2 are therefore optionally mixed in the processing head 22 and are discharged on the distal end 23 of the functional section 20, said distal end being located on the processing side, to a work target.

The manual operation section 10 of the housing 1 has a protective housing 12. A holding bracket begins at the protective housing 12 and extends in the axial direction A toward the proximal end 13 on the operator side. A holding grip 14 begins on the lower side of the holding bracket and is materially attached to the same in an orientation transverse to the axial direction A. An operator can hold the extrusion device 100 with a hand surface on the holding grip 14, and can actuate a lever grip 15 of the manual operation section 10 with the fingers. To do so, the lever grip 15 is pulled toward the hand grip 14 in order to execute an operation stroke which triggers the extrusion of the multi-component materials from the containers 2.

Figure 2:
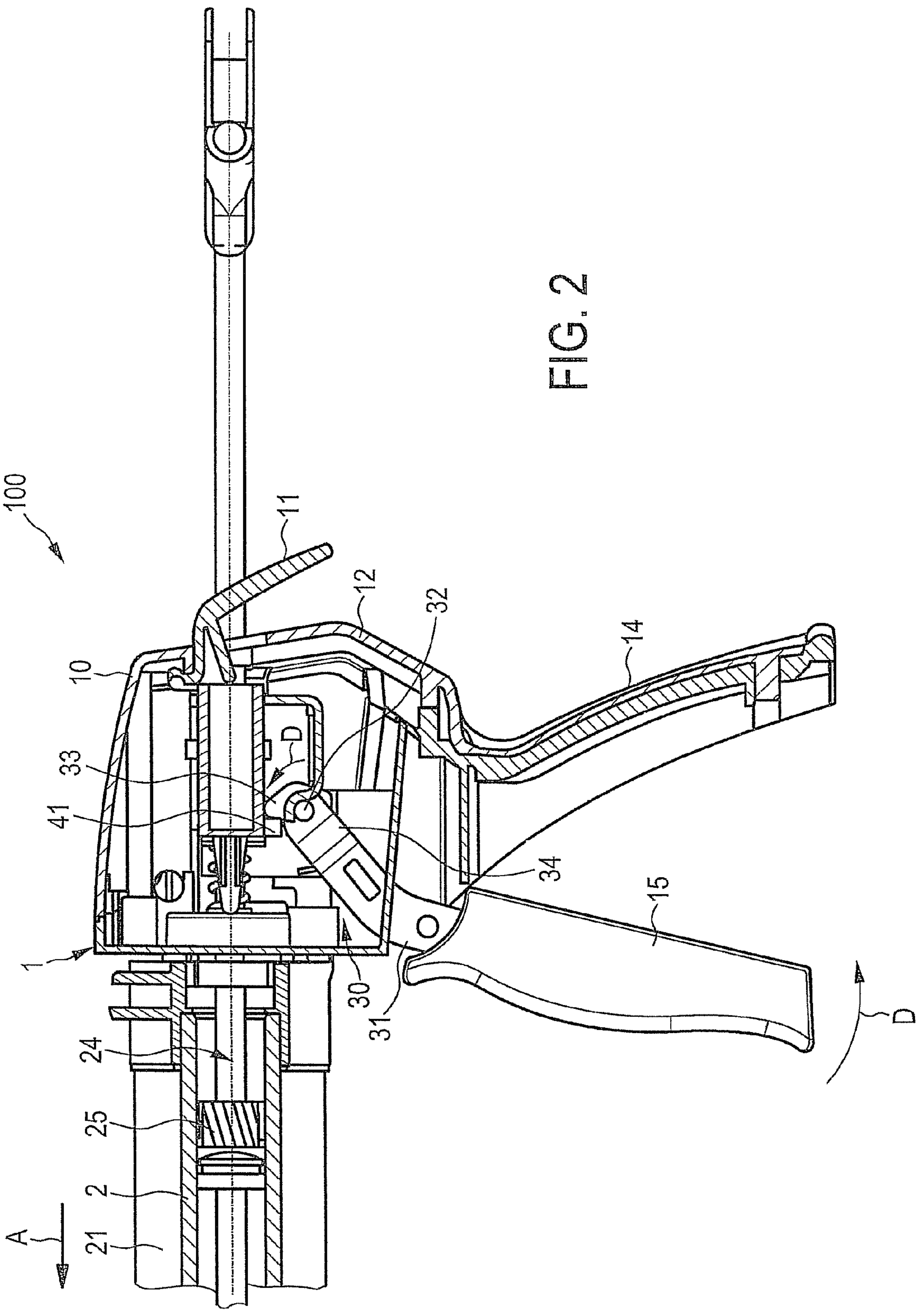
FIG. 2 shows a sectional view of a manual operation section of a housing, having an improved lever arrangement on the extrusion device of FIG. 1.

As can be seen in FIG. 2, the lever grip 15, as part of a lever arrangement 30 in the manual operation section 10, continues a lever grip arm 34 of a lever body 31. Upon actuation of the lever grip 15, an extrusion rod arrangement 24 is actuated which effects the extrusion of the materials from the two containers 2. The extrusion rod arrangement 24 acts by means of a piston 25 on a counter-piston in each of the containers 2, wherein each counter-piston is functionally assigned to its respective piston 25. Said counter piston is not illustrated in detail. The material in each of the containers 2 is extruded via said counter-piston and is discharged into the processing head 22 of the housing 1. In FIG. 2, only one container 2 and one container receptacle 21 are shown. As can be seen in the other figures, the extrusion device 100 nevertheless serves to receive two containers 2, each in a container receptacle 21 provided for each container 2, wherein said container receptacles 21 are arranged parallel to each other in the axial direction A in the functional section 20.

In the manual operation section 10, the lever arrangement 30 has a lever body 31 which transitions into the lever grip 15 on the section thereof which extends away from the protective housing 12. The lever body 31 is therefore directly actuated by means of actuation of the lever grip 15.

The lever body 31 is mounted in the lever arrangement 30 on a rotary axis 32 designed as a bearing pin. The lever body 31 has a lever push arm 33 on one side of the rotary axis, and a lever grip arm 34 on the other side of the rotary axis 32. The lever grip arm 34 transitions into the lever grip 15 at a visible angle. Upon actuation of the lever grip arm 34 via the lever grip 15, the lever push arm 33 works to transmit force in a rotary movement D thereof in the axial direction A to a drive body 41 attached on an extrusion rod arrangement 24, and converts the rotary movement D of the lever push arm 33 into a linear movement of the drive body 41.

Figure 3:
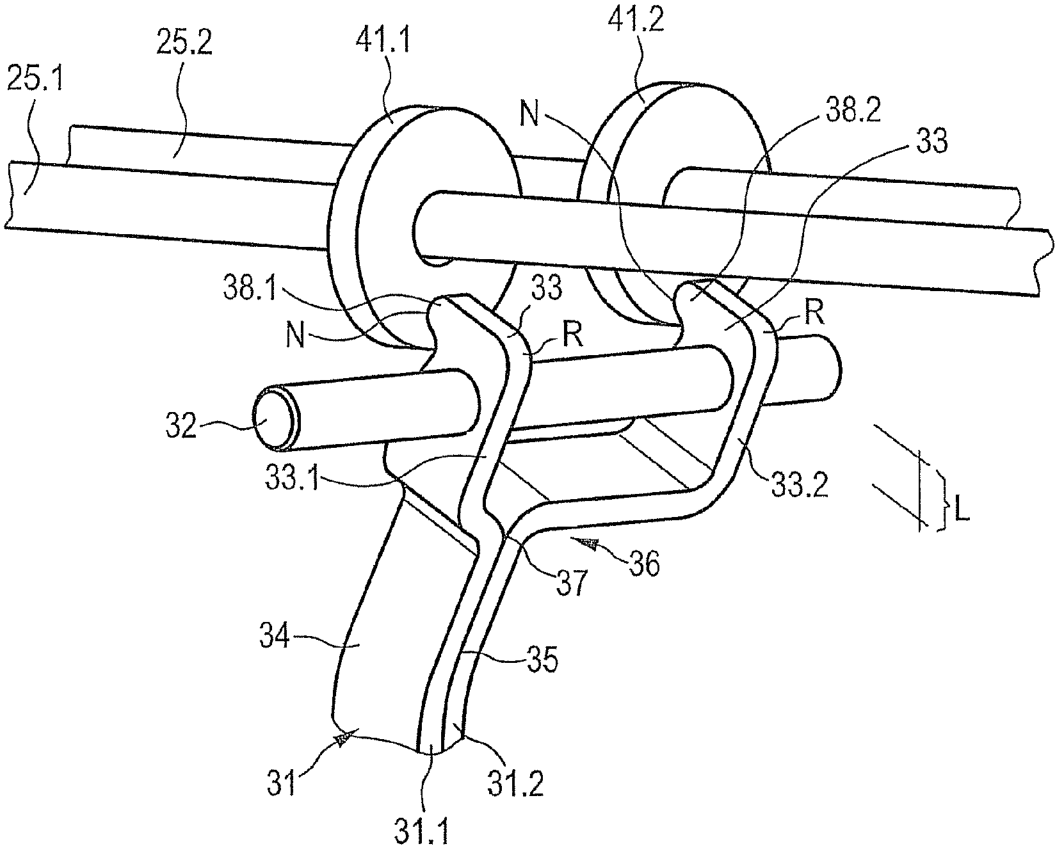
FIG. 3 shows a perspective partial view of a lever body formed in accordance with an embodiment of the present invention, having a part of the lever grip arm, and having two lever push arms which are formed by the fork on the lever body, the fork having two fork sections and a fork trunk.

As can be seen in FIG. 3, in the present case the lever body 31 has a fork 36 which forms two fork sections 33.1, 33.2 and a fork trunk 35. The two fork sections 33.1, 33.2 open into two lever push arms 33 (with identical reference numbers as in FIG. 2), of which only one can be seen in the side view given in FIG. 2. The lever body 31 as such is mounted to the rotary axis 32 by means of the two fork sections 33.1, 33.2, by means of the two lever push arms 33. The bearing pin of the rotary axis 32 penetrates the fork sections 33.1, 33.2 for this purpose. Also, the fork sections 33.1, 33.2 form a part of the lever grip arm 34 sectionally. In other words, a forking point 37 of the fork 36 is a part of the lever grip arm 34 on the other side of the rotary axis 32. On one side of the rotary axis 32, the lever push arms 33 extend from the fork sections 33.1, 33.2. As such, the rotary axis 32, formed as a bearing pin in the present case, is capable of mounting the lever bodies 31 in a particularly stable manner on two points—particularly on a first fork section 33.1 and on a second fork section 33.2. The lever body 31 as such is formed in each case as two metal plain sheets 31.1, 31.2, as seen in FIG. 3, up to its transition into the lever grip 15. The metal plain sheets 31.1, 31.2 abut each other in the fork trunk 35, and are separated from each other in the two fork sections 33.1, 33.2. In concrete terms, a first metal plain sheet 31.1 forms a first lever push arm 33, and a second metal plain sheet 31.2 forms a second lever push arm 33, and, in the present case, respectively, a first fork section 33.1 and a second fork section 33.2.

Each of the lever push arms 33 has a roller head 38.1 or 38.2 formed with a nose-shape, on the fork end of a first fork section 33.1 or a second fork section 33.2. The first and/or the second roller head 38.1, 38.2 has a nose contour N which can roll down on the first and/or second drive bodies 41.1, 41.2. A roller head 38.1, 38.2 has a back surface R opposite the nose contour N. Both the nose contour N of the roller heads 38.1, 38.2 and the back contours R thereof are constructed as identical components in the present case.

Also, the length L between the rotary axis 32 and the fork end is identical for both lever push arms 33 in the present case, wherein the length L is only shown for the second lever push arm 33.

In the present case, a first and second drive body 41.1, 41.2 are designed as a circular disk which is rotationally symmetric about a rod 25.1, 25.2, and are held on the rod 25.1, 25.2 of the extrusion rod arrangement 24 in a clamping manner when in the tilted position. As is explained below with reference to FIG. 6, the first and second drive bodies 41.1, 41.2 are part of a drive unit 40 along with a third and fourth drive body 41.3, 41.4, wherein the drive bodies 41.1, 41.2, 41.3, 41.4 are held at a distance from each other in the drive unit 40 by a holder 42.

Figure 4:
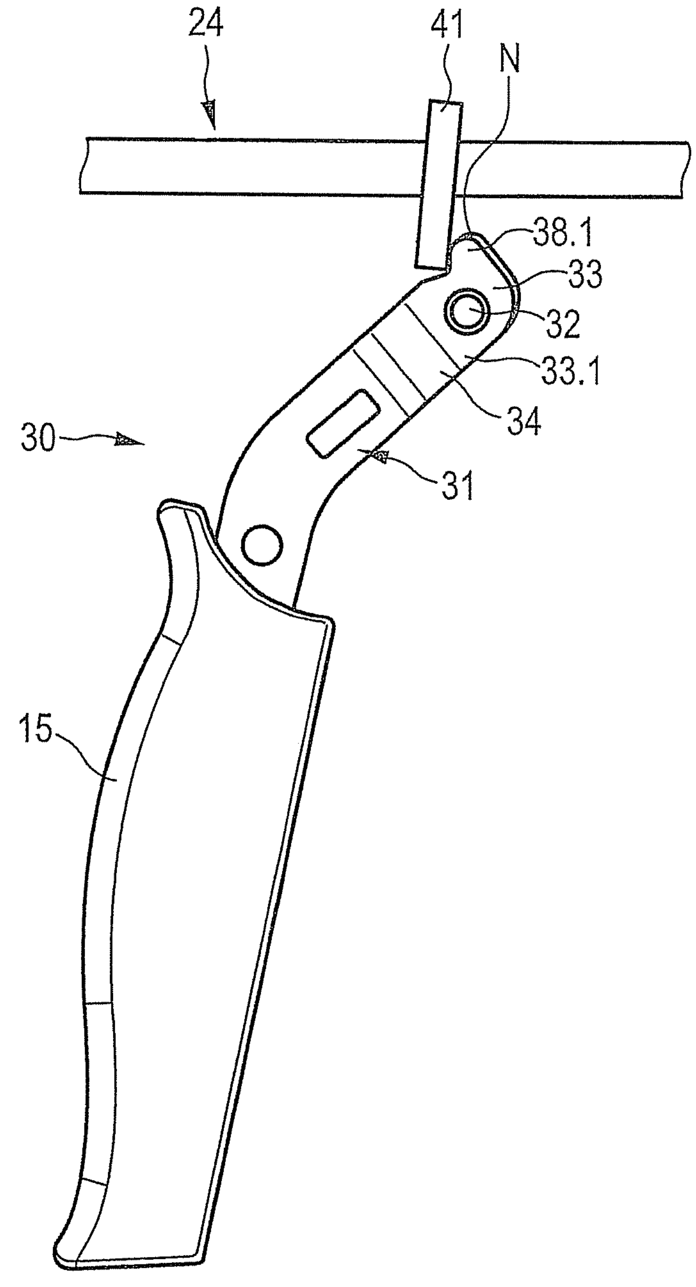
FIG. 4 shows a partial perspective side view of the lever body of FIG. 3.
Figure 5A:
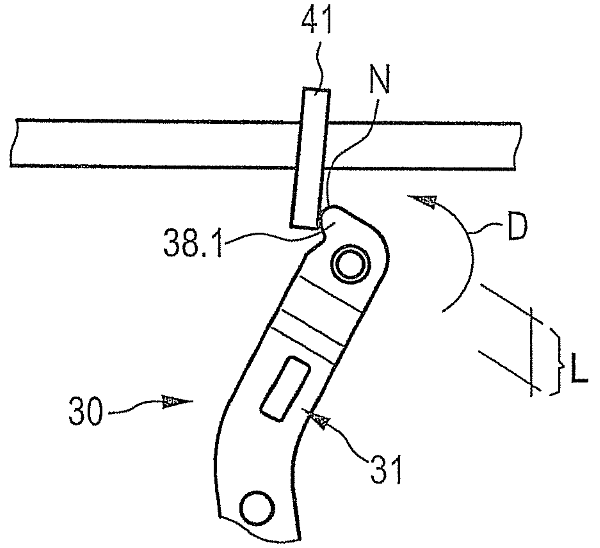
FIGS. 5A and 5B show a side view of a lever body formed in accordance with an embodiment of the present invention in two functional positions—before and after an operation stroke—and an offset of a first and second drive body on a first and second rod of the extrusion rod arrangement visible therefrom.
Figure 5B:
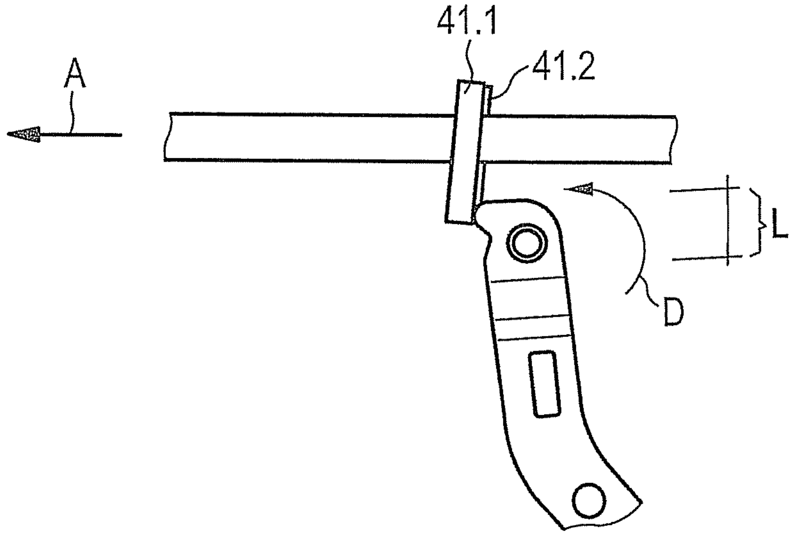

At this point, the mode of operation of the lever arrangement 30 upon actuation of the lever grip 15 is explained with reference to FIG. 4, FIG. 5A, and FIG. 5B. FIG. 4, FIG. 5A, and FIG. 5B are side views of FIG. 3, and additional embodiments may be understood in reference to FIG. 4, FIG. 5A, and FIG. 5B for the fork sections 33.1, 33.2, and the roller heads 38.1, 38.2 of each of the lever push arms 33. Pushing forces can be distributed to two drive bodies 41.1, 41.2, wherein the drive bodies 41.1, 41.2 are clamping elements in the present case, by means of the fork 36 on the lever bodies 31, in a particularly reliable manner. By means of a rotary movement D of the lever body 31 about the rotary axis 32, as is portrayed in FIG. 5A and FIG. 5B, the drive bodies 41 are moved linearly in the axial direction A. This process can be repeated arbitrarily.

FIG. 4 also shows the detail of the lever arrangement 30 in FIG. 3, along with the extrusion rod arrangement 24 and a drive body 41, representing the drive bodies 41.1, 41.2, in a side view. A lever push arm 33 formed by a fork section 33.1 has a nose-shaped roller head 38.1 on the fork end, which engages in a force-transmitting manner with its nose contour N on the drive body 41, as seen in FIG. 4. The lever body 31 of the lever arrangement 30 is shown in a position reflecting that in FIG. 1 or FIG. 2 in the present case, i.e., without actuation by the fingers of an operator. This same position of a lever body 31 is also shown in FIG. 5A. Upon actuation of the lever grip 15, the same is pulled toward the hand grip 14, such that the lever push arm 33 situated on one side of the rotary axis 32 moves forward, and thereby initially tilts the drive body 41 such that the same becomes fixed and clamped on its rod of the extrusion rod arrangement 24. Next, the nose contour N of the roller head 38.1 rolls down on the drive body 41 and pushes the same forward with its rod.

By means of such a rotary movement, indicated by a D (see, e.g., FIGS. 5A and 5B), of the roller head 38.1, the drive body 41 is advanced along the axial direction A. The rotary movement D of the lever push arm 33 is converted into a linear movement of the drive body 41 along the axial direction A. An axial movement of the drive body 41 can be adjusted according to requirements. As such, the nose contours N of the roller heads 38.1, 38.2 can be correspondingly formed on the fork ends, in order to achieve a certain characteristic for the axis pushing process and the axial path for the drive body 41. The lever body 31, provided with a fork in the present case, transports all the drive bodies 41 in the axial direction A one variable but predetermined unit of advancement per operation stroke of the lever push arm 33. As seen in FIG. 5A, both drive bodies 41.1, 41.2 are arranged parallel to each other and one behind the other at the start of an operation stroke; for this reason, only the front contour of a drive body 41 is shown in FIG. 5A. The drive bodies 41.1, 41.2 are each fixed in a clamping manner on their rods 25.1 and/or 25.2 at the end of the operation stroke, with a slight axial offset to each other. For this reason, both the first drive body 41.1 and the second drive body 41.2 are recognizable in FIG. 5B. A first unit of advancement of the first drive body 41.1 differs in the present case from a second unit of advancement of the second drive body 41.2. This can be due on the one hand to differing counter forces in two different containers upon extrusion of the materials. Such different units of advancement, as are indicated in the present case in reference to FIG. 5A, and FIG. 5B, can also be achieved by setting different axis separations for the first fork section 33.1 and the second fork section 33.2—measured between the rotary axis 32 and the point of engagement of the nose contour N of the first and/or the second roller head 38.1, 38.2 on the first and the second drive body 41.1, 41.2. A length L of a lever push arm 33, as indicated in FIG. 5A and FIG. 5B, can be individually set for each lever push arm on the first and/or second fork section 33.1, 33.2. Also, a different nose contour N can be chosen for each section 33.1, 33.2.

Figure 6:
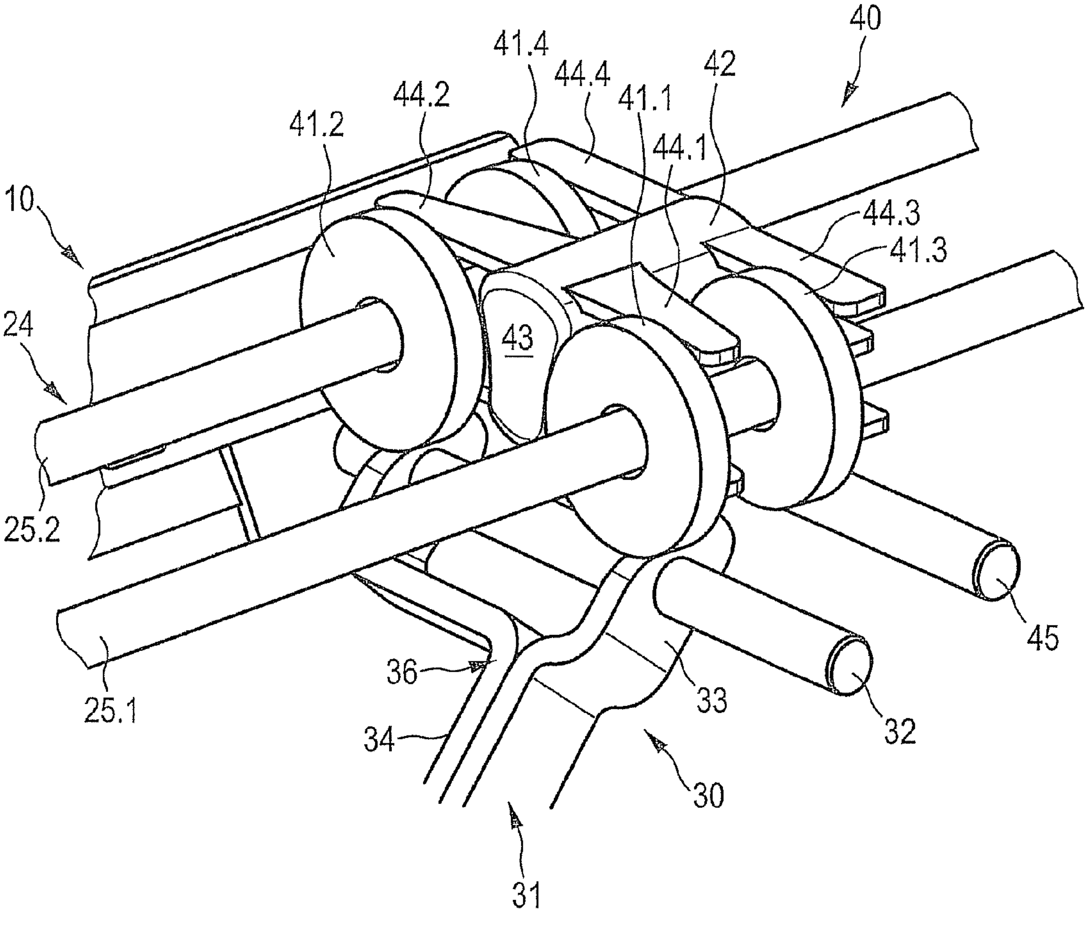
FIG. 6 shows a perspective view of a drive unit having a frontal and rear drive body on each of the same first and/or second rods of the drive rod arrangement, having a holder for four drive bodies, wherein the drive unit is in a functional position before an operation stroke by means of a lever body, for an extrusion device as in FIG. 1 to FIG. 5B.

FIG. 6 shows the drive unit 40 mentioned above, having four drive bodies 41.1, 41.2, 41.3, 41.4 and a holder 42. The holder 42 has a holder axis 43 and four arms 44.1, 44.2, 44.3, 44.4 which begin at the holder axis 43. Said arms hold the associated drive bodies 41.1, 41.2, 41.3, 41.4 from the rear and separate the same.

The first drive body 41.1 forms a frontal drive body on the first rod 25.1 of the extrusion rod arrangement 24, the frontal drive body abutting a nose contour N of a first roller head 38.1 at the rear of the frontal drive body.

A third drive body 41.3 forms a rear drive body on the same first rod 25.1—the same optionally abutting a limit stop rod 45.

The second drive body 41.2 forms a frontal drive body on the second rod 25.2 of the extrusion rod arrangement 24, abutting a nose contour N of a second roller head 38.2 on the rear side thereof. A third drive body 41.4 is held on the same first rod 25.2 of the rod arrangement 24 as the rear drive body—the same optionally abutting a limit stop rod 45.

The mode of operation of the drive unit 40 proceeds with an advancing movement, as described above, of each of the frontal drive bodies 41.1, 41.2 on the rods 25.1, 25.2 upon a force being exerted by a roller head 38.1 and/or 38.2, with a tilted and clamping fixation of the same. If the operator releases the lever grip 15, a counter pressure is still exerted on the drive bodies 41.1, 41.2 in the direction opposite the direction of advancement, due to the viscosity of the extrusion material in the containers 2. The rear drive bodies 41.3, 41.4 become tilted and clamping on the rods 25.1 and/or 25.2 due to the counter force exerted against the direction of advancement. Ultimately, the drive unit 40 maintains its position in this manner, even upon release of the lever grip 15, until a process of extruding the material in the position in which the drive unit 40 is held is completed. Upon completion of the extrusion process initiated by a single advancement stroke, the drive unit, with all the drive bodies 41.1, 41.2, 41.3, 41.4 thereof, is set back into a starting position. Once the starting position is reached, the rear drive bodies 41.3, 41.4 abut the limit stop rod 45 on the rear side of said rear drive bodies, and as such stop the return process. For the purpose of executing the return process, the drive bodies 41.1, 41.2, 41.3, 41.4 are brought to the rods 25.1, 25.2, respectively, in an untilted position by means of the arms 44.1 44.2, 44.3, 44.4. This can be supported by actuation of the lever 11 shown in FIG. 1, the same acting on the holder 42. When the drive bodies 41.1, 41.2, 41.3, 41.4 are brought even with the rods by the holder 42, the drive bodies can each move freely on the rods 25.1, 25.2 with clearance.

Finally, a renewed operation stroke can be initiated by the operator by means of actuating the lever grip 15.

Figure 7:
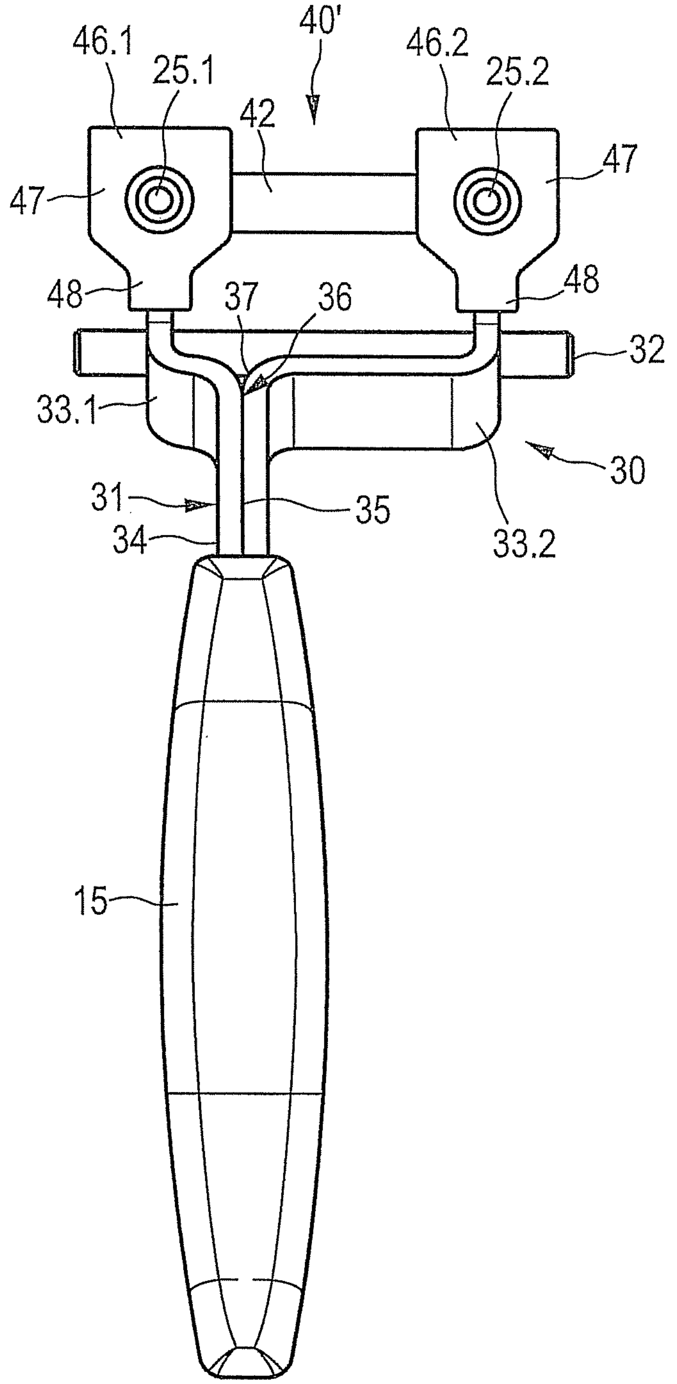
FIG. 7 shows a frontal view in the axial direction of a device of a lever body of an extrusion device as in FIG. 1 to FIG. 6, having a fork visible in the same, the fork having two fork sections and a fork trunk, and having drive bodies with a modified shape.

FIG. 7 shows a modified embodiment of a system consisting of a lever body 31 which continues the lever grip 15, in combination with a drive unit 40' which has modified drive bodies 46.1, 46.2.

The lever body 31 with the lever grip 15 is essentially identical to the lever body described above. Likewise, the drive unit 40' has a similar design to the drive unit 40 with a holder 42. Only the drive bodies 46.1, 46.2 are varied from the circular disk drive bodies 41. In the present case, the drive bodies 46.1, 46.2—which are likewise disk-shaped—are each held on a rod 25.1, 25.2 of the extrusion rod arrangement 24. The disk of the drive bodies 46.1, 46.2 has a composite contour in the present case. The contour has a holding surface 47 which narrows in a substantially trapezoidal shape, and has a tilt surface 48 connected to the narrowing, narrow side thereof, wherein said tilt surface 48 has a rectangular shape. A roller head 38.1, 38.2, which engages with the drive body 46.1, 46.2 from the rear, preferably engages on the tilt surface 48 thereof from the rear in a force-transmitting manner, and as such is capable of tilting the drive body 46.1, 46.2 is an especially simple manner, and therefore of clamping the same on a rod 25.1, 25.2.

The invention claimed is:

1. An extrusion device for the extrusion of single- or multi-component materials from at least one container, the extrusion device comprising:

a housing extending substantially along an axial direction, the housing comprising a functional section comprising at least one container receptacle; and a manual operation section comprising a lever arrangement and an extrusion rod arrangement, the extrusion rod arrangement actuated by the lever arrangement, wherein material from the at least one container is extruded;

wherein the lever arrangement comprises a lever body mounted on a rotary axis, the lever body comprising at least two lever push arms arranged on one side of the rotary axis and a lever grip arm arranged on an opposite side of the rotary axis, wherein at least one of the lever push arms acts directly on a drive body attached on the extrusion rod arrangement in a force-transmitting manner upon actuation of the lever grip arm; and wherein the lever body comprises a fork comprising at least two fork sections and a fork trunk, wherein each of the at least two fork sections extends into one of the at least two lever push arms, and the fork trunk extends into the lever grip arm.

2. An extrusion device according to claim 1, wherein the lever body is mounted on the rotary axis through the at least two fork sections.

3. An extrusion device according to claim 1, wherein a point of forking of the fork forms a part of the lever grip arm on the opposite side of the rotary axis from the at least two lever push arms.

4. An extrusion device according to claim 1, wherein the at least two fork sections form at least one partial section of the lever grip arm.

5. An extrusion device according to claim 1, wherein the lever body is mounted on the rotary axis through the fork trunk.

6. An extrusion device according to claim 1, wherein the rotary axis comprises a bearing pin.

7. An extrusion device according to claim 1, wherein the lever body is formed by at least two metal sheets at least in a region of the fork, wherein the metal sheets abut each other in the fork trunk and are separated in the at least two fork sections.

8. An extrusion device according to claim 1, wherein at least one lever push arm comprises a fork end which can roll down on the drive body upon actuation of the lever grip arm in a force-transmitting manner.

9. An extrusion device according to claim 8 wherein the fork end comprises a roller head formed with a nose shape.

10. An extrusion device according to claim 1, wherein the at least two lever push arms comprises a first lever push arm and a second lever push arm, wherein the first lever push arm has a first length which is different from a second length of the second lever push arm.

11. An extrusion device according to claim 10 wherein the first lever push arm comprises a first fork end which is different from a second fork end of the second lever push arm.

12. An extrusion device according to claim 11 wherein a first roller head of the first lever push arm has a different nose contour than a second roller head of the second lever push arm.

13. An extrusion device according to claim 1, wherein the drive body is formed as a clamping element which is fixedly held in a tilted and clamping manner on a rod of the extrusion rod arrangement when one of the at least one lever push arms acts to transmit a force, and wherein the drive body is displaced one predetermined unit of advancement in an axial direction for every operation stroke of the one of the at least one lever push arms.

14. An extrusion device according claim 1 comprising a second drive body, a first rod, and a second rod, wherein the at least two fork sections comprises a first fork section and a second fork section, wherein the drive body is held on a first rod, the drive body being assigned to a first fork section, and the second drive body is held on the second rod, the second drive body being assigned to the second fork section.

15. An extrusion device according to claim 1 comprising a second drive body, wherein the drive body is displaced a first unit of advancement, and the second drive body is displaced a second unit of advancement, and the first unit of advancement is different from the second unit of advancement.

16. An extrusion device according to claim 1 comprising a second drive body, wherein the drive body and the second drive body are each arranged as a frontal drive body relative to a first and second rear drive body, respectively, wherein the drive body and the second drive body are held on the same rod of the drive rod arrangement as their respective rear drive bodies, and wherein each of the respective frontal and rear drive bodies are held at a distance from each other in a drive unit by a holder.

17. An extrusion device according to claim 1, comprising a second drive body, wherein the drive body and the second drive body are arranged as frontal drive bodies, and comprising a third drive body and a fourth drive body as rear drive bodies in a drive unit, wherein the rear drive bodies are held at a distance to the frontal drive bodies by a holder, the holder being loaded by a spring, and wherein the holder comprises a holder axis and four arms extending from the holder axis, wherein the arms hold one drive body each.

18. An extrusion device according to claim 1 comprising a second drive body, a third drive body, and a fourth drive body, wherein at least one of the third and fourth drive bodies is fixedly held on a rod in a tilted and clamping manner opposite the direction of advancement upon the exertion of a force.

* * * * *